US012618672B2

(12) United States Patent
Zhang et al.

(10) Patent No.: US 12,618,672 B2
(45) Date of Patent: May 5, 2026

(54) METHOD AND DEVICE FOR ORIENTING

(71) Applicant: Wuhan University, Wuhan (CN)

(72) Inventors: Tao Zhang, Wuhan (CN); Jingui Zou, Wuhan (CN)

(73) Assignee: WUHAN UNIVERSITY, Wuhan (CN)

( * ) Notice: Subject to any disclaimer, the term of this patent is extended or adjusted under 35 U.S.C. 154(b) by 437 days.

(21) Appl. No.: 18/129,105

(22) Filed: Mar. 31, 2023

(65) Prior Publication Data

US 2023/0314136 A1 Oct. 5, 2023

(30) Foreign Application Priority Data

Mar. 31, 2022 (CN) .......................... 202210336535.0

(51) Int. Cl.
G01C 17/34 (2006.01)
G01C 17/38 (2006.01)
G01S 19/14 (2010.01)

(52) U.S. Cl.
CPC ............. G01C 17/34 (2013.01); G01C 17/38 (2013.01); G01S 19/14 (2013.01)

(58) Field of Classification Search
CPC ........ G01C 17/00; G01C 17/34; G01C 17/38; G01C 21/02; G01C 21/24; G01S 3/7867; G01S 19/14; G01S 19/485
USPC ......................................................... 33/268
See application file for complete search history.

(56) References Cited

U.S. PATENT DOCUMENTS

| | | | | |
|---|---|---|---|---|
| 8,694,051 B2 * | 4/2014 | Kulik | ..................... | G01C 17/34 |
| | | | | 73/1.01 |
| 9,453,731 B2 * | 9/2016 | Vos | ......................... | G01C 21/24 |
| 9,562,764 B2 * | 2/2017 | France | ................... | G01B 11/26 |
| 10,175,358 B2 * | 1/2019 | Struckhoff | .............. | G01S 17/08 |
| 10,591,605 B2 * | 3/2020 | Smits | ....................... | G01S 17/42 |
| 10,795,030 B2 * | 10/2020 | Schipper | .............. | G01C 21/165 |
| 2004/0187328 A1 * | 9/2004 | Satoh | ..................... | G01C 17/28 |
| | | | | 33/356 |
| 2006/0021238 A1 * | 2/2006 | Sato | ........................ | G01C 17/38 |
| | | | | 33/355 R |

(Continued)

FOREIGN PATENT DOCUMENTS

| | | | | | |
|---|---|---|---|---|---|
| CN | 104459728 A | * | 3/2015 | ............. | G01S 19/23 |
| CN | 113624218 A | * | 11/2021 | ............. | G01C 11/04 |
| WO | WO-2014102841 A1 | * | 7/2014 | ............. | G01C 17/34 |

*Primary Examiner* — John Fitzgerald
*Assistant Examiner* — Daniel M Quinn
(74) *Attorney, Agent, or Firm* — JCIP GLOBAL INC.

(57) ABSTRACT

A method for orienting includes: setting a digital optical imaging device including a photosensitive device, a lens, and a global navigation satellite system (GNSS) receiver; allowing an optical axis of the lens to pass through a geometric center of the photosensitive device, so that a celestial body is imaged on the photosensitive device; and positioning a current position by using the GNSS receiver, and recording an accurate time; calculating an accurate azimuth angle of the celestial body at this moment, wherein, at this time, an imaging position of the celestial body on the photosensitive device is located on an extension line of a ligature of the azimuth of the celestial body and a geometric center of the photosensitive device, thereby through accurately extracting the imaging position of the celestial body, a placement orientation of the digital optical imaging device is determined, and a north direction is obtained.

2 Claims, 3 Drawing Sheets

(56) References Cited

U.S. PATENT DOCUMENTS

| | | | |
|---|---|---|---|
| 2010/0283840 A1* | 11/2010 | Belenkii | G01C 21/02 |
| | | | 356/8 |
| 2011/0275408 A1* | 11/2011 | Kulik | G01S 19/23 |
| | | | 455/556.1 |
| 2012/0173143 A1* | 7/2012 | Belenkii | G01C 21/02 |
| | | | 348/36 |
| 2014/0022539 A1* | 1/2014 | France | G01C 3/08 |
| | | | 701/1 |
| 2014/0156219 A1* | 6/2014 | Soubra | G01C 15/06 |
| | | | 702/150 |
| 2020/0033955 A1* | 1/2020 | Powers | G06F 3/0304 |
| 2020/0225040 A1* | 7/2020 | Di Pietro | G01C 21/025 |
| 2022/0413160 A1* | 12/2022 | Fortney | G01S 19/485 |

\* cited by examiner

METHOD AND DEVICE FOR ORIENTING

CROSS-REFERENCE TO RELATED APPLICATIONS

Pursuant to 35 U.S.C. § 119 and the Paris Convention Treaty, this application claims foreign priority to Chinese Patent Application No. 202210336535.0 filed Mar. 31, 2022, the contents of which, including any intervening amendments thereto, are incorporated herein by reference. Inquiries from the public to applicants or assignees concerning this document or the related applications should be directed to: Matthias Scholl PC., Attn.: Dr. Matthias Scholl Esq., 245 First Street, 18th Floor, Cambridge, MA 02142.

BACKGROUND

The disclosure relates to the field of mapping and exploration, and in particular to a method and device for orienting.

Orienting (or north-finding) is a basic requirement in mapping, surveying and other fields. Rough method and device for orienting can be realized by using a magnetic compass, which is low in accuracy and easily interfered by an external magnetic field. Accurate north-finding is usually realized by using an astronomical method, a gyroscopic method and a dual-GNSS receiver baseline direction method. These methods have relatively high accuracy, but require complex device and long observation time.

SUMMARY

To solve the deficiencies in the prior art, the disclosure provides a method and device for orienting with low cost and high accuracy.

To achieve the above objective, the disclosure provides a method for orienting, comprising:

1) setting a digital optical imaging device comprising a photosensitive device, a lens, and a global navigation satellite system (GNSS) receiver;
2) allowing an optical axis of the lens to pass through a geometric center of the photosensitive device, so that a celestial body is imaged on the photosensitive device; and
3) positioning a current position by using the GNSS receiver, and recording an accurate time; calculating an accurate azimuth angle of the celestial body at this moment, wherein, at this time, an imaging position of the celestial body on the photosensitive device is located on an extension line of a ligature of the azimuth of the celestial body and a geometric center of the photosensitive device, thereby through accurately extracting the imaging position of the celestial body, a placement orientation of the digital optical imaging device is determined, and a north direction is obtained.

In a class of this embodiment, in 3), an imaging result of the photosensitive device is read and binarized, and a binarization threshold is adjusted until a white value is reduced to a region; the region is an image of the celestial body; a center of mass of the region is obtained; coordinates $(X_i, Y_i)$ of the center of mass are the coordinates of a center of the image of the celestial body.

The angle of the celestial body in the XOY coordinate system is $b = \arctan(Y_i/X_i) + (Y<0)*180$.

Meanwhile, the output result of the GNSS receiver is read, and the current time and position information is extracted from the output result. A pre-stored algorithm for calculating the azimuth angle and altitude angle of the celestial body according to the current position and time is called according to the time and position information to obtain the current azimuth angle a of the celestial body. It is determined according to the latitude of the current position whether it is in the northern hemisphere or the southern hemisphere, and the azimuth of the target is obtained by using the following formulae, respectively:

in the northern hemisphere, $c = a - b + 180 - e$;

in the southern hemisphere, $c = a - b - 180 - e$;

finally, the result is normalized to 0 to 360 degrees.

$c = (c + 360) \bmod 360$, where $c$ is an azimuth angle of the target.

The e value is a system error.

The method further comprises calibrating the system error as follows: setting $e = 0$, and mounting a calibration part on a horizontal operation platform by using a gyroscope north-finder; orienting the calibration part towards due north; attaching a horizontal long edge of a shell of the digital optical imaging device to the calibration part, and calculating the c value; at this time, the correct c should be 0; if the c value measured at this time has a system error, and storing c as system error e, thus completing the calibration.

In another aspect, the disclosure further provides a device for orienting, comprising a photosensitive device, a panoramic lens, a three-axis tilt sensor, a GNSS receiver, a calculation unit, a storage unit, a display unit, a power supply unit and a shell, an optical axis of the panoramic lens is perpendicular to a photosensitive surface of the photosensitive device, and a focal length is adjusted to be close to infinity, so that an astronomical target is imaged clearly; an intersection point of the optical axis of the panoramic lens and the photosensitive device is used as an origin O, two edges of the photosensitive device are used as coordinate axes, and a rectangular plane coordinate system XOY is established on the photosensitive device; the three-axis tilt sensor is rigidly connected to the photosensitive device and the shell, and two axes X' and Y' of the three-axis tilt sensor are parallel to the axes X and Y of the rectangular plane coordinate system XOY, respectively; a sight is provided on the shell; the OY axis is parallel to the sight and one edge of the shell, and the one edge is used as a measurement edge; and the power supply unit, the GNSS receiver, the three-axis tilt sensor, the photosensitive device, the storage unit and the display unit are connected to the calculation unit through corresponding electrical interfaces, respectively.

In a class of this embodiment, the photosensitive device is a charge coupled device (CCD) or a complementary metal oxide semiconductor (CMOS).

In a class of this embodiment, the lens is a 180° panoramic lens.

In a class of this embodiment, a Baader AstroSolar film is provided in the front of the lens to cover or uncover the lens.

In the disclosure, based on the astronomical observation method and in combination with the modern devices and designs, the north-finding device is light, and the north-finding operation is fast and accurate. By using this method, when the photosensitive device with 8 million pixels is used and the solar altitude angle is not greater than 45°, the north-finding result with an accuracy of 0.10 can be achieved within 30 s (the time consumption of 30 s is used for positioning and timing after the cold start of GNSS), which is basically consistent with the dual-GNSS device for orienting accuracy of 1 m baseline. However, the volume weight can be only ½₀ of that of the dual-GNSS device for orienting, and the cost estimation is only 1% of that of the dual-GNSS device for orienting. If the resolution of the photosensitive device is improved and the positional relationship between the lens and the photosensitive device is adjusted, for example, if a photosensitive device with 13 million pixels is used and the optical axis of the lens is arranged on the middle line of the long edge of the photosensitive device, the highest resolution of 0.03 s can be obtained, and the advantages in volume and cost can still be maintained.

The scheme in the disclosure is simple and easy to implement and high in practicability, solves the problems of low practicability and inconvenient practical application in the related art, and can improve the user experience and ensure the orientation accuracy while greatly reducing the usage cost, and thus has a significant market value.

DETAILED DESCRIPTION

Figure 1:
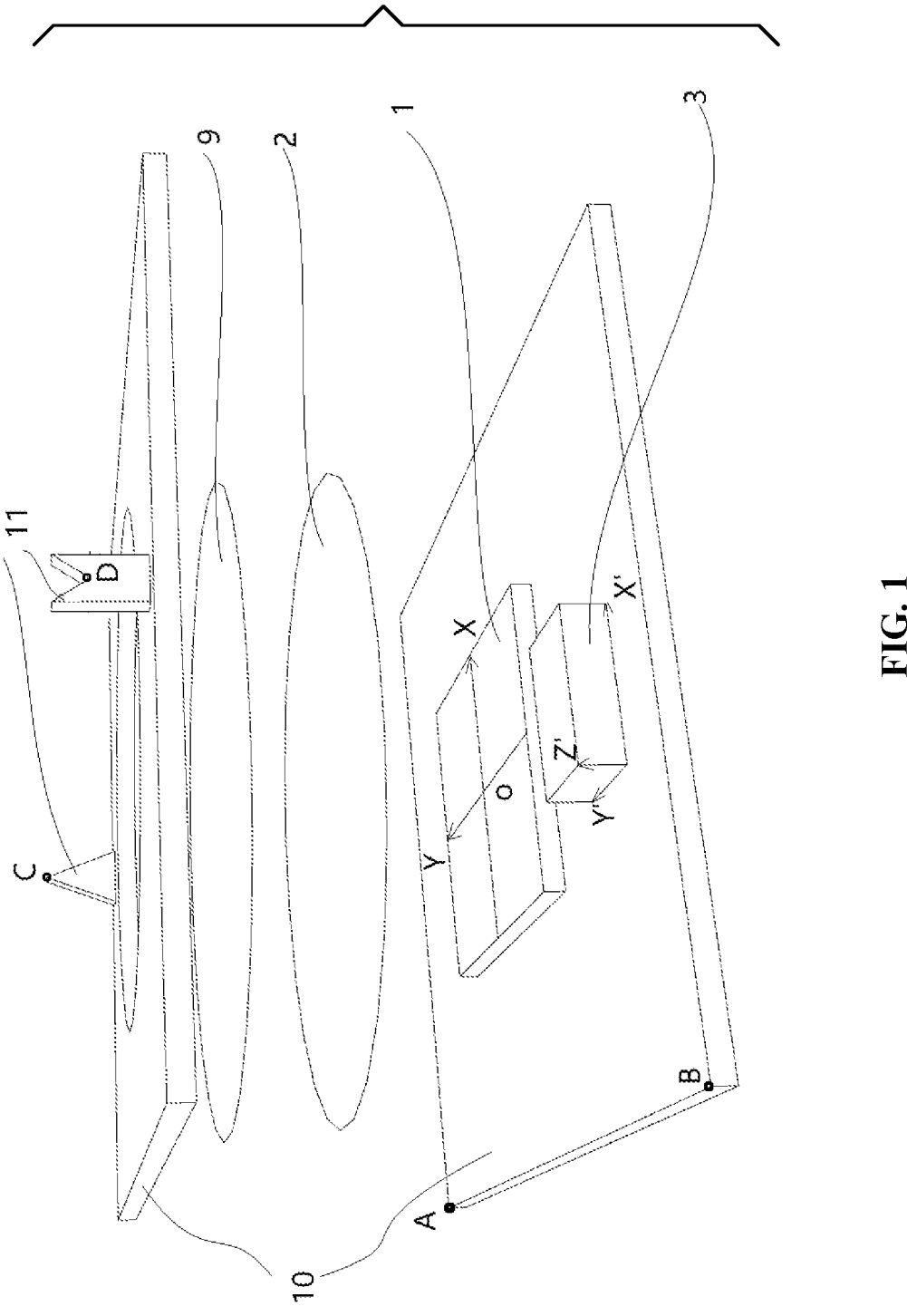
FIG. 1 is a schematic diagram of the relationship between components according to an embodiment of the disclosure.

From time immemorial, it has been a reliable means to realize north finding by an astronomical method. For example, north finding is realized by using the sun. In the northern hemisphere, at noon, the sun should be in the south, and the shadow caused by the sun points to the north. In the southern hemisphere, the opposite is true.

However, the accuracy of finding the north by the naked eyes and an ordinary timer and in combination with the sun is limited, and can only be qualitative but be difficulty to be accurately quantized. This is because there is a time difference between different areas, and the angle of the sun is different at the same moment every day of the year.

The principle of the disclosure will be described below A digital optical imaging device is provided first, so that a celestial can be imaged on a photosensitive device (e.g., CDD or CMOS). The optical axis of the lens passes through the geometric center of the photosensitive device (e.g., CCD or CMOS), so that the sun (or the moon or other celestial bodies) can be imaged on the photosensitive device. Then, the current position is positioned by using the GNSS to obtain accurate time, and the accurate azimuth angle of the sun (or the moon or other celestial bodies) at this moment is calculated. At this time, the imaging position of the celestial body on the photosensitive device is located on the extension line of the ligature of the azimuth of the celestial body and the geometric center of the photosensitive device. The imaging position can be accurately extracted, so that the placement azimuth of the device is accurately determined to obtain the north direction.

An embodiment of the disclosure preferentially provides a device for orienting (i.e., a digital optical imaging device), which comprises a CCD or CMOS photosensitive device, a 180° panoramic lens, a three-axis tilt sensor, a GNSS receiver, a calculation unit, a storage unit, a display unit, a power supply unit, a Baader AstroSolar film and a shell. an optical axis of the panoramic lens is perpendicular to a photosensitive surface of the photosensitive device, and the focal length is adjusted to be close to infinity, so that the astronomical target is imaged clearly; the intersection point of the optical axis of the panoramic lens and the photosensitive device is used as an origin O, two edges of the photosensitive device are used as coordinate axes, and a rectangular plane coordinate system XOY is established on the photosensitive device; the three-axis tilt sensor is rigidly connected to the photosensitive device and the shell, and two axes X' and Y' of the three-axis tilt sensor are parallel to the axes X and Y of the established rectangular plane coordinate system XOY, respectively; a sight is provided on the shell; the OY axis is parallel to the sight and one edge of the shell, and this edge is used as a measurement edge; and, the power supply unit, the GNSS receiver, the three-axis tilt sensor, the photosensitive device, the storage unit and the display unit are connected to the calculation unit through respectively electrical interfaces, respectively.

The storage unit stores an astronomical ephemeris and an algorithm for calculating the azimuth angle and altitude angle of the celestial body according to the current position and time, and the calculation unit can call the algorithm from the storage unit.

The shell is tightly attached to a target to be measured, or a sight is aligned with the target. The calculation unit reads the tilt angle of the three-axis tilt sensor and displays it on the display unit, and the operator adjusts the device to be horizontal according to the display.

The imaging result of the photosensitive device is read and binarized, and a binarization threshold is adjusted until the white value is reduced to a region. This region is the image of the celestial body, and the center of mass of this region is obtained. The coordinates $(X_i, Y_i)$ of the center of mass are the coordinates of the center of the image of the celestial body. The angle of the celestial body in the XOY coordinate system is $b = \arctan(Y_i/X_i) + (Y<0)*180$. Meanwhile, the output result of the GNSS receiver is read, and the current time and position information is extracted from the output result. The algorithm for calculating the azimuth angle and altitude angle of the celestial body according to the current position and time is called from the storage unit according to the time and position information to obtain the current azimuth angle a of the celestial body. It is determined according to the latitude of the current position whether it is in the northern hemisphere or the southern hemisphere, so that the azimuth of the target is obtained. During a specific implementation, this process can be implemented as an automatic operation process by using the computer software technology.

With reference to FIG. 1, specifically, a device for orienting preferentially provided in an embodiment comprises:

- a photosensitive device 1 configured for imaging and digitizing an image for further processing;
- a panoramic lens 2, which has an angle of view of 180° and ensures that the celestial body can be imaged on the photosensitive device 1 regardless of its orientation;
- a three-axis tilt sensor 3 configured to assist in adjusting the photosensitive device 1 to be horizontal;
- a GNSS receiver configured to acquire the current position and time;
- a calculation unit configured to calculate the position and north direction of the celestial body;
- a storage unit configured to store an astronomical ephemeris and an algorithm for calculating the azimuth angle and altitude angle of the celestial body according to the current position and time;

a display unit configured to display the tilt angle, assist in adjusting to be horizontal, and display the orientation result;

a power supply unit configured to supply power to the whole system;

a Baader AstroSolar film 9 configured to reduce the intensity of sunlight and protect the photosensitive device from damage;

a shell 10 configured to accommodate other components of the device and measure a local target by using its measurement edge; and a sight 11 configured to align a distant target.

With reference to FIG. 1, the installation and use of the device in this embodiment is implemented as follows.

Figure 2:
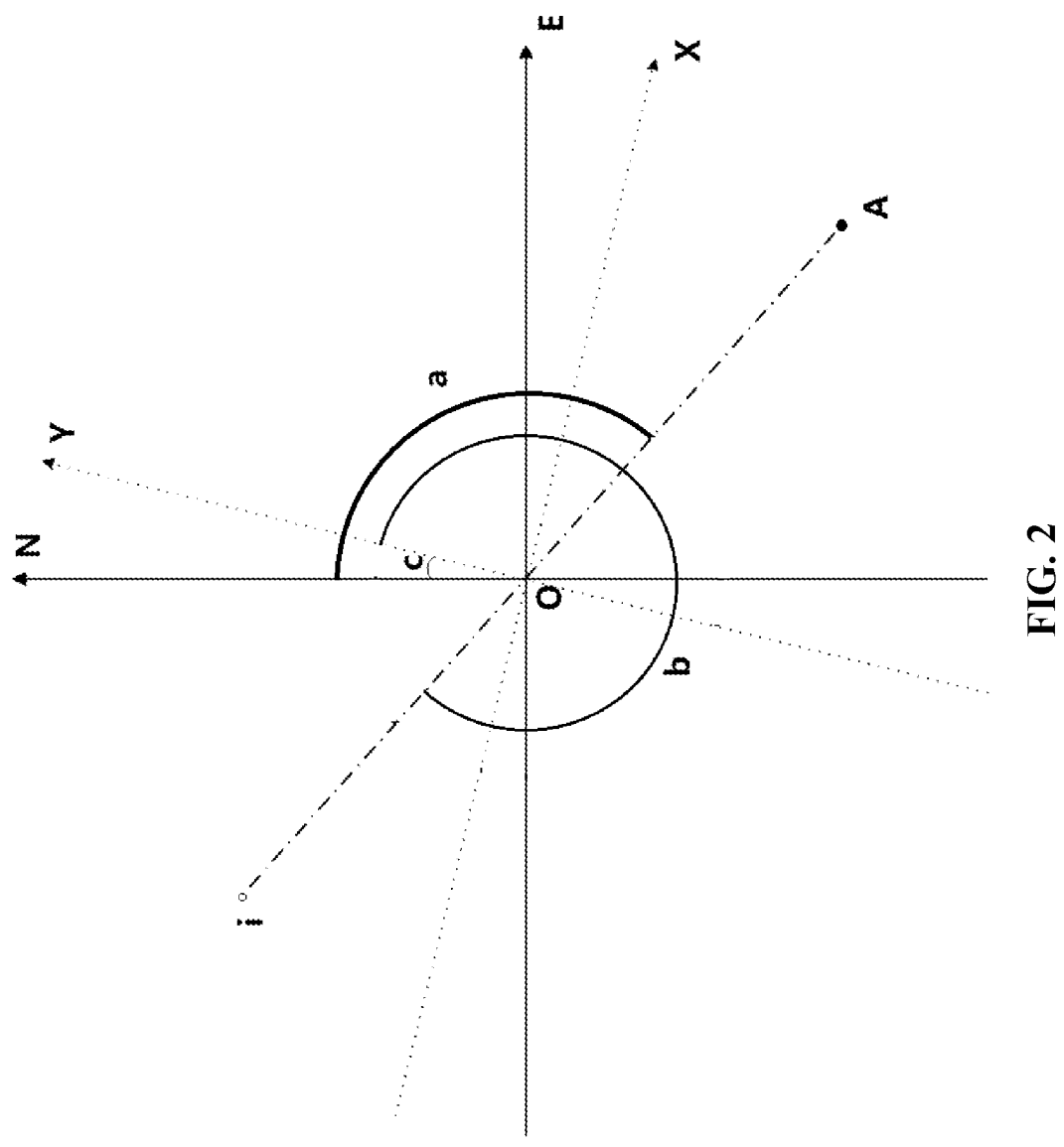
FIG. 2 is the coordinate system and the relationship between angles when in the northern hemisphere according to an embodiment of the disclosure.

1. The panoramic lens 2 and the photosensitive device 1 are installed together, and the optical axis of the panoramic lens 2 is perpendicular to the photosensitive plane of the photosensitive device 1. By using the intersection of the optical axis of the panoramic lens 2 with the photosensitive device 1 as an origin O and two edges of the photosensitive device 1 as coordinate axes, a rectangular plane coordinate system XOY is established on the photosensitive device 1, as shown in FIG. 2.

2. The focal length of the panoramic lens 2 is adjusted to be close to infinity, so that the sun, the moon or other celestial bodies can be clearly imaged on the photosensitive device 1.

3. The three-axis tilt sensor 3 is rigidly connected to the photosensitive device 1 and the shell 10. Two axes X' and Y' of the three-axis tilt sensor 3 are parallel to the axes X and Y of the rectangular plane coordinate system established in the step 1, respectively, so that the three-axis tilt sensor 3 can reflect the tilt angle of the photosensitive device 1. The shell 10 is located outside and plays a role in protection and accommodation.

4. The power supply unit, the GNSS receiver, the three-axis tilt sensor 3, the photosensitive device 1, the storage unit and the display unit are connected to the calculation unit.

5. The storage unit stores an astronomical ephemeris and an algorithm for calculating the azimuth angle and altitude angle of the celestial body according to the current position and time. The specific algorithm belongs to the prior art and will not be repeated in the disclosure.

6. The Baader AstroSolar film 9 is placed in the front of the panoramic lens 2 when in use, and can selectively cover or not cover the panoramic lens 2. The Baader AstroSolar film 9 covers the panoramic lens 2 only when the sun is used as an observation target, while does not cover the panoramic lens 2 when the moon or other celestial bodies are observed.

7. The sight 11 is provided on the shell 10, the OY axis of the XOY coordinate system is parallel to the line of sight DC of the sight 11 and one edge (e.g., BA) of the shell, and this edge is used as a measurement edge. During a specific implementation, the sight 11 can be arranged above the top surface of the shell 10, and the shell 10 has at least one straight edge for use as a parallel reference of the OY axis.

8. Due to the installation error and the device error, correction needs to be performed before use. On a horizontal operation platform, a calibration part is used to find the north in other ways (gyroscope, etc.), and the measurement edge of the shell 10 is tightly adhered to the calibration part. The azimuth reading obtained by the device is recorded and then stored as a system error for correction in practical applications. For example, if the read angle is e degrees, the e is stored. When in use, e is subtracted from the measured angle to obtain the corrected accurate azimuth angle.

9. When in use, the calculation unit first reads the tilt angles of the X and Y axes of the three-axis tilt sensor 3 and then displays them on the display unit. The photosensitive device 1 can be adjusted to be horizontal by the user according to the digits, that is, the tilt angle is 0. The target is aligned by the sight 11 or the measurement edge of the shell 10 is tightly adhered to the target.

10. The GNSS receiver acquires the current position and time, and the calculation unit acquires the information. Meanwhile, the celestial body A (e.g., the sun or the moon) is imaged as i on the photosensitive device 1. The calculation unit acquires the image and can calculation the azimuth angle a of the celestial body (e.g., the sun or the moon) at this moment according to the position and time by using the existing method. The coordinate system of the azimuth angle a is EON. The origin of the coordinate system EON coincides with the origin of the rectangular coordinate system XOY, that is, the both are O, where the horizontal axis is due east E, and the vertical axis is due north N. The included angle c between the coordinate system XOY and the coordinate system EON is the azimuth angle of the target in the disclosure.

11. The image acquired by the calculation unit is binarized, and the white angle is reduced to a region by adjusting the binarization threshold. This region is the image of the celestial body, and the center of mass of this region is obtained. The coordinates $(X_i, Y_i)$ of the center of mass are the coordinates of the center of the image of the celestial body. The origin O of the coordinate system XOY and the center point i are linked to obtain the ligature Oi. The direction b of the ligature in the coordinate system XOY can be calculated according to the coordinates $(X_i, Y_i)$ of i in the XOY coordinate system:

$b = \arctan(Y_i/X_i) + (Y<0)*180$, where $(Y<0)*180$ represents a logic operation. It is determined whether $Y<0$ is true or false. If $Y<0$, $(Y<0)=1$, and $(Y<0)*180=180$; and, if $Y>0$, $(Y<0)=0$, and $(Y<0)*180=0$.

There is a relationship in the northern hemisphere:

$$c = a - b + 180$$

There is a relationship in the southern hemisphere:

$$c = a - b - 180$$

Figure 3:
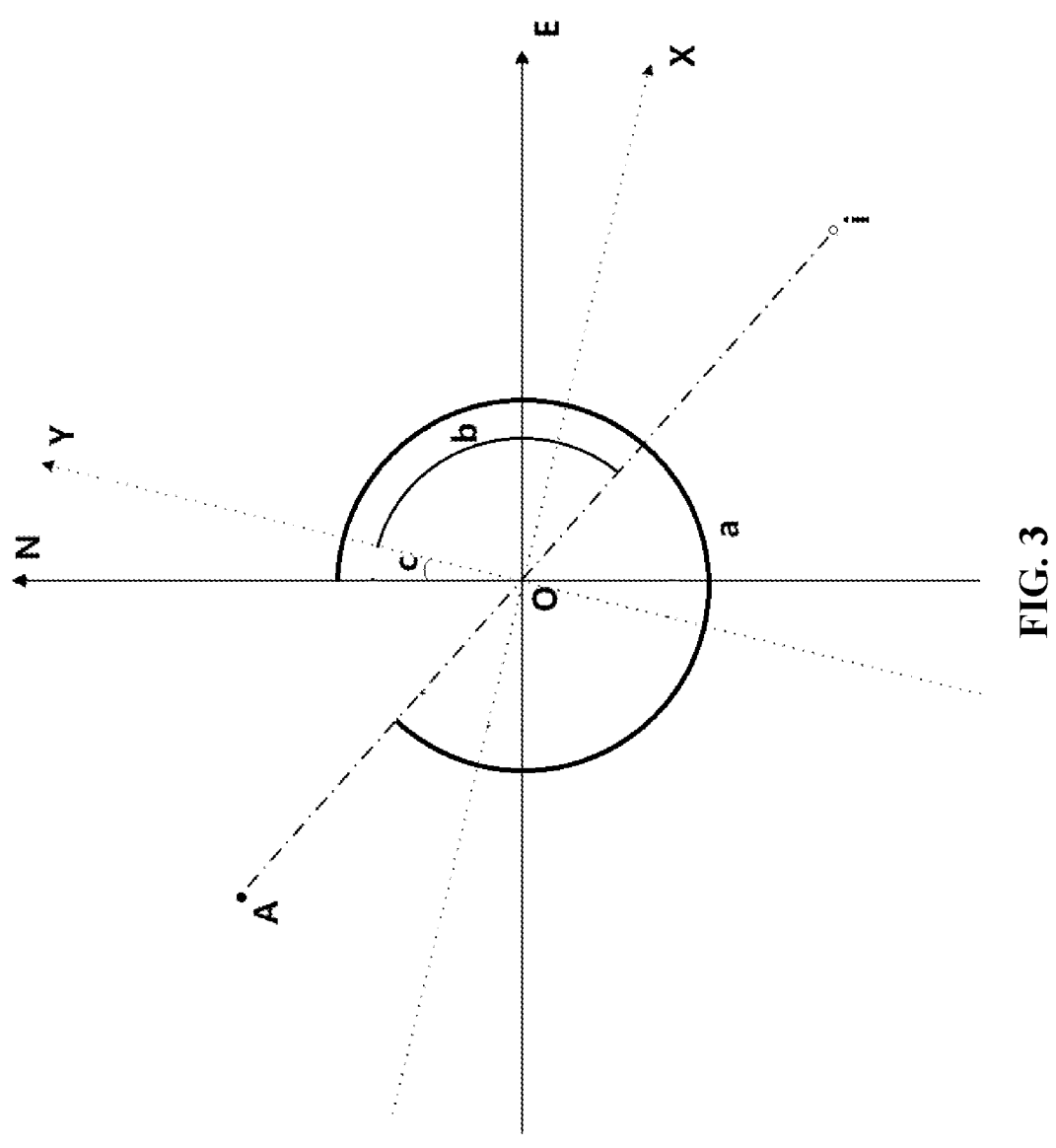
FIG. 3 is the coordinate system and the relationship between angles when in the southern hemisphere according to an embodiment of the disclosure.

The above relationships are shown in FIGS. 2 and 3.

By using the latitude in the coordinates acquired by the GNSS, it can be determined whether the specific position is in the northern hemisphere or the southern hemisphere. The e is subtracted from the obtained c to remove the target azimuth of the system error:

$$c = c - e$$

Finally, the result is normalized to 0 to 360 degrees:

$$c = (c + 360) \bmod 360, \text{ where } c \text{ is the azimuth angle of the target.}$$

For the convenience of implementation reference, the specific implementation process of this embodiment is described below.

1. Materials:

[1] The IMX317 CMOS sensor is equipped with a 180° panoramic lens integrated module, and the optical axis of the lens perpendicularly passes through the center of the CMOS sensor (the IMX317 resolution is 3864×2202 pixels, so the position where the optical axis of the lens passes through is 1932,1101)

[2] MPU6050 three-axis tilt sensor

[3] NEO-M8 GNSS receiver

[4] IMX6 ARM MPU (calculation) is equipped with 256 MRAM or 512 M ROM (storage)

[5] SPI interface 12864 OLED display screen

[6] Lithium polymer battery and PMU

[7] Baader AstroSolar film

[8] Shell

2. Manufacturing and Usage Steps:

According to the step 1 in the implementation method and the specific implementation materials, it can be known that the origin O of the XOY coordinate system is located at a point (1932,1101) of the IMX317.

The Baader AstroSolar film is covered outside the lens.

The 180° panoramic lens equipped with IMX317 is adjusted, so that the focal length is close to infinity. That is, the celestial body can be clearly imaged.

The IMX317 and the MPU6050 three-axis tilt sensor are installed and fixed, so that the X and Y axes of the MPU6050 are parallel to X and Y edges of the IMX317, respectively (that is, the X and Y axes of the XOY coordinate system are consistent in direction), and the axes X and Z are parallel to the horizontal long edge and height of the shell. The horizontal long edge is used as a measurement edge and is tightly attached to the target to measure the orientation of the target.

The IMX317 is connected to the CSI2 interface of the IMX6 ARM.

The MPU6050 is connected to the IIC interface of the IMX6 ARM.

The NEO-M8 is connected to the UART interface of the IMX6 ARM.

The SPI interface 12864 OLED is connected to the SPI interface of the IMX6 ARM.

Linux is installed in the ROM of the IMX6 ARM, and a device for orienting algorithm system is run. This system has the following functions:

reading the imaging result of the IMX317 and calculating angle b of the brightest spot in the XOY coordinate system;

reading the data of the MPU6050 and displaying the tilt angles of the X and Y directions on the 12864 OLED display screen;

reading the output result of the NEO-M8 GNSS receiver, and extracting the current time and position information from the output result;

calculating the azimuth angle a of the sun according to the current time and position;

when the data output by the MPU6050 indicates that the X and Y directions are horizontal, reading the imaging result of the IMX317 and binarizing the image to reserve only the imaging region of the celestial body, calculating the coordinates of the center of mass of the imaging region of the celestial body (i.e., the position (Xi,Yi) of the image i of the celestial body in the XOY coordinate system, calculating the angle $b=\arctan(Yi/Xi)+(Y<0)*180$ in the XOY coordinate system, reading the output result of the NEO-M8 GNSS receiver, extracting the current time and position from the output result, calculating the azimuth angle a of the sun according to the current time and position, and further calculating the direction the target by the following method according to whether the current position is in the northern hemisphere or the southern hemisphere:

in the northern hemisphere:

$$c=a-b+180-e$$

in the southern hemisphere:

$$c=a-b-180-e$$

Finally, the result is normalized to 0 to 360 degrees:

$$c=(c+360)\bmod 360, \text{ where } c \text{ is the azimuth angle of the target.}$$

3. Acquisition of the e Value (i.e., the Correction of the System Error)

e=0 is set, and a calibration part is installed on a horizontal operation platform by using a gyroscope north-finder as an aid. The direction is due north. The horizontal long side of the shell of the north-finding device is tightly attached to the calibration part, and the c value is calculated. At this time, the correct c should be 0. Therefore, the c value measured at this time is the system error, and c is stored as e, so that the calibration is completed.

Due to the action of the Baader AstroSolar film, in the daytime, under normal conditions, when the north-finding device is placed horizontally, only the sun can be imaged on the IMIX317, while other light sources are blocked.

It will be obvious to those skilled in the art that changes and modifications may be made, and therefore, the aim in the appended claims is to cover all such changes and modifications.

What is claimed is:

1. A method for orienting, comprising:

1) Setting a digital optical imaging device comprising a photosensitive device, a lens, and a global navigation satellite system (GNSS) receiver;

2) allowing an optical axis of the lens to pass through a geometric center of the photosensitive device, so that a celestial body is imaged on the photosensitive device; and 3) positioning a current position by using the GNSS receiver, and recording an accurate time; calculating an accurate azimuth angle of the celestial body at this moment; and through accurately extracting the imaging position of the celestial body, and based on a relationship between the accurate azimuth angle of the celestial body and the imaging position of the celestial body on the photosensitive device, a placement orientation of the digital optical imaging device is determined, and a north direction is obtained;

wherein in 3), an imaging result of the photosensitive device is read and binarized, and a binarization threshold is adjusted until a white value is reduced to a region; the region is an image of the celestial body; a center of mass of the region is obtained; coordinates (Xi, Yi) of the center of mass are the coordinates of a center of the image of the celestial body;

an angle of the celestial body in an XOY coordinate system is $b=\arctan(Yi/Xi)+(Y<0)*180$;

an output result of the GNSS receiver is read, and current time and position information is extracted from the output result; a pre-stored algorithm for calculating the azimuth angle and altitude angle of the celestial body according to the current position and time is called according to the time and position information to obtain the current azimuth angle a of the celestial body; according to a latitude of the current position, determining the current position is in the northern hemisphere or the southern hemisphere, and the azimuth of a target is obtained by using the following formulae:

in the northern hemisphere, $c=a-b+180-e$;

in the southern hemisphere, $c=a-b-180-e$;

the result is normalized to 0 to 360 degrees;

$c = (c+360)\bmod 360$, where $c$ is an azimuth angle of the target; and e is a system error.

2. The method of claim 1, wherein the method further comprises calibrating the system error as follows: setting e=0, and mounting a calibration part on a horizontal operation platform by using a gyroscope north-finder; orienting the calibration part towards due north; attaching a horizontal long edge of a shell of the digital optical imaging device to the calibration part, and calculating the c value; at this time, the correct c should be 0; if the c value measured at this time has a system error, storing c as system error e, thus completing the calibration.

\* \* \* \* \*